9270X
J. R. Cambell.
Diving Dress.
Patented Nov. 30, 1835.
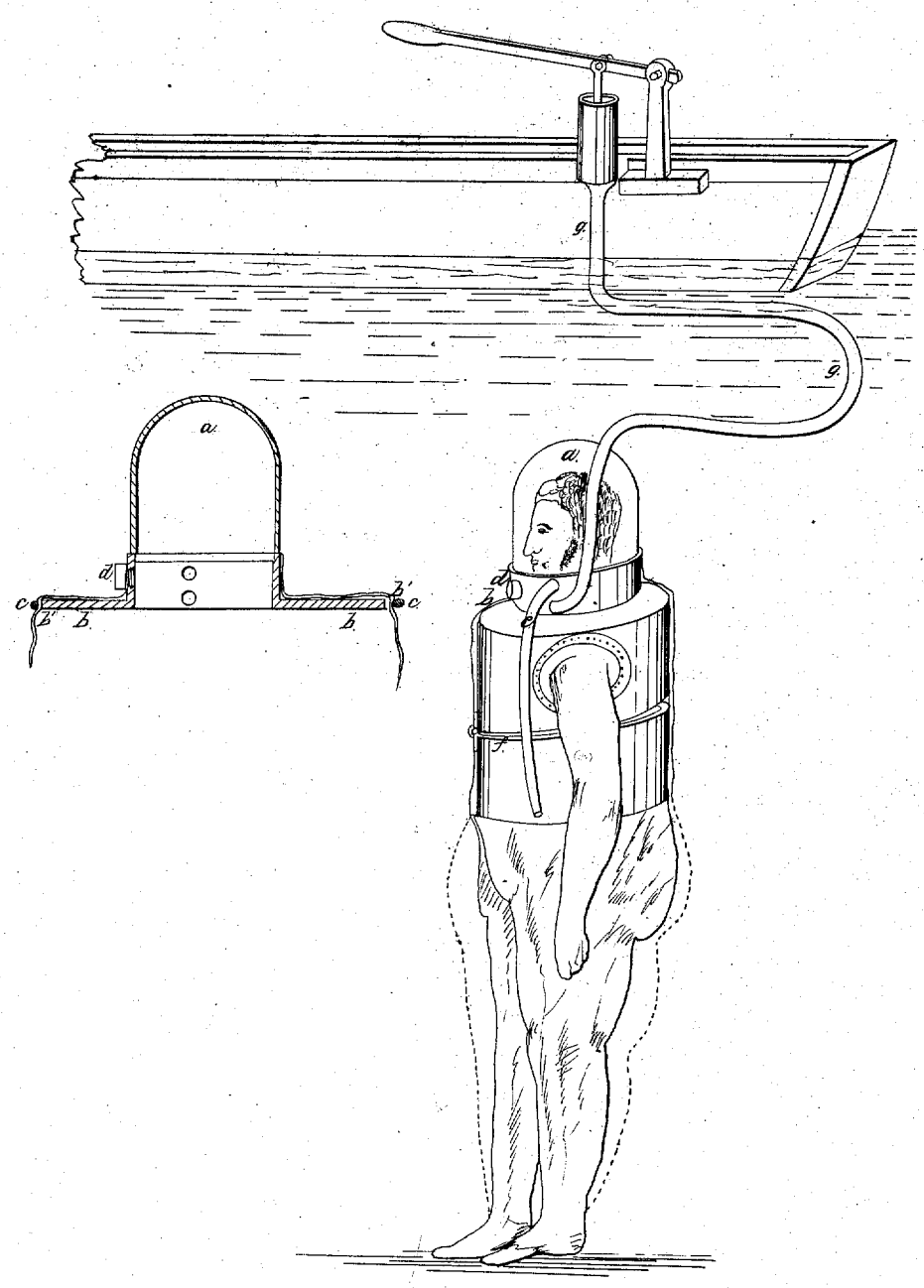

92704 Nov 30 1835 [illegible]

John R. Campbell of Boston Mass

Letters Patent.

The Schedule referred to in these Letters Patent and making part of the same containing a description in the words of the said John Read Campbell himself of his improvement in the Diving Dress.

To all to whom these presents shall come. Be it known that I John Read Campbell of Boston in the County of Suffolk and State of Massachusetts, have invented a new and useful improvement in the diving dress, and that the following is a full and exact description of the construction and operation of said improvement, as invented by me, it being understood that it is an improvement on the dress or suit already patented by Nathaniel Wolcott of Sidney in the County of Delaware and State of New York, on the seventeenth day of April 1834 under the title of a diving suit, which patent in all its right and title was assigned over to me the thirteenth day of July 1835 and duly recorded August 4th 1835 in the Patent Office.

One part on which I improve is the covering for the head, and to effect this I throw off the Indian Rubber or Gum Elastic of which the cap as well as the rest of the dress is composed and substitute in its place a cap of Glass, that there may be an uninterrupted means of seeing around the diver not provided for in the old suit and this will be the means of preventing the risk of fatal accidents from entangling of the cords or ropes attached to the diver and also those from other sources. The cap of Glass is to descend as low down the face as desired, say to within a short distance of the shoulders where it will be united to a copper band which will then after descending some short distance below said junction, swell out again by a rectangular lip sufficiently protruded to fill up the opening which is left when the Rubber cap was displaced and which must be large enough to allow the body

[illegible]

138

9270X to render the dress fast forward.. This size of the opening is necessary as the cloth cannot with safety to the diver be fixed and or gathered up around the rim, because to join the two, that is, the cloth and the rim so as to be water tight, a groove is made all round the rim ~~[illegible]~~ on the circumference thereof and the cloth being brought above it, another circular and rounded hoop is clasped tightly on so as to fill up the groove and therein retain the cloth firmly to prevent leakage. Into the Copper Band beneath the junction with the glass is formed a round hole to be closed with a screw cap so as that it may be removed at pleasure on arriving at the top of the water, so as to be able to converse through the opening, and on one side of it are to be formed two holes. ~~[illegible]~~ one above the other, the top one is intended to receive the end of a flexible tube, to be screwed fast into it, which tube has the other end left open and dangling in the water, for the purpose of allowing the impure air to escape. It is also used as a regulator from that law of fluids, by which they seek a level as is demonstrated in the junction of two pipes, one large and the other small, wherein the fluid will stand at the same height in each. So with the regulator for as it is raised by the arm of the diver, so will be the corresponding rise in the air contained in the dress, and as he will then have it less inflated, he will sink should he depress the end of the tube, then the air in the dress will descend to inflate it and he will consequently rise: Beneath the dress I add a cylindrical case of metal which the diver occupies by passing into its open and lower end, so that his head shall protrude from the upper one, which is open also and opposite his shoulders are holes for his arms to pass through, the whole case of course resting on these points on his shoulders. It descends to about his hips and therefore presents no covering to his legs, nor to his arms which are thus at perfect

9270X liberty. It is also furnished with a joint on the centre of the cylinder so as to allow a motion forward or to stoop. This use is to prevent accident from the sudden exhaustion of the air lest the Body might be compressed. The lower tube holder has its tube screwed into it, the other end of which rises to the top of the water and there receives the air by compress from an air pump or other contrivance

What I claim as my invention and for which I now ask letters Patent is the combination of the cap of Glass with the Rubber dress and the use of the metal Cylinder according to the plan set forth. In testimony that the above is a full description of the construction and use of my improvement. I have hereunto set my hand this tenth day of November Eighteen Hundred and thirty five

Witnesses
C. H. Wharton
Henry Stone

T. R. Cambell (948 Words)

[illegible]